June 20, 1950 S. ADKINS 2,512,219
SPRING SUPPORTED TRACTOR SEAT
Filed Dec. 11, 1946
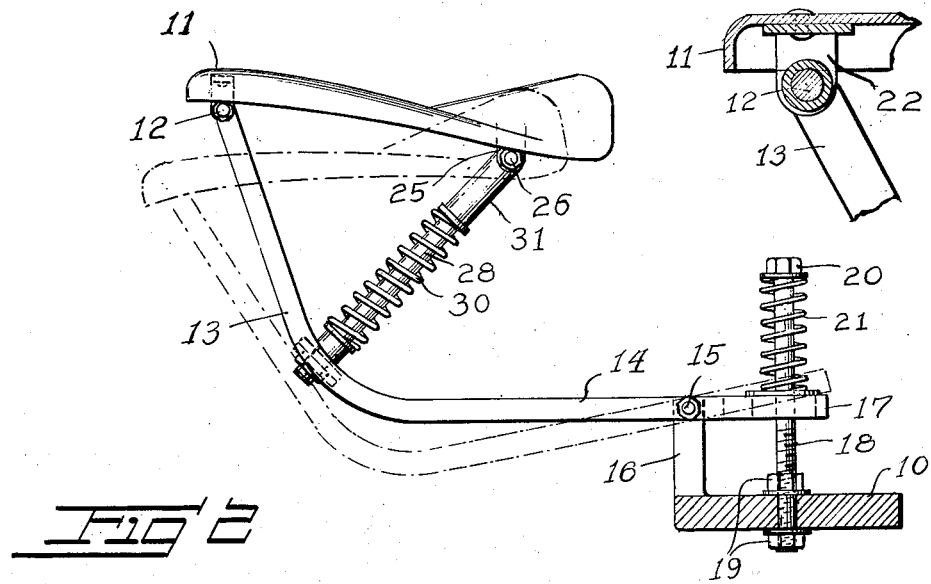
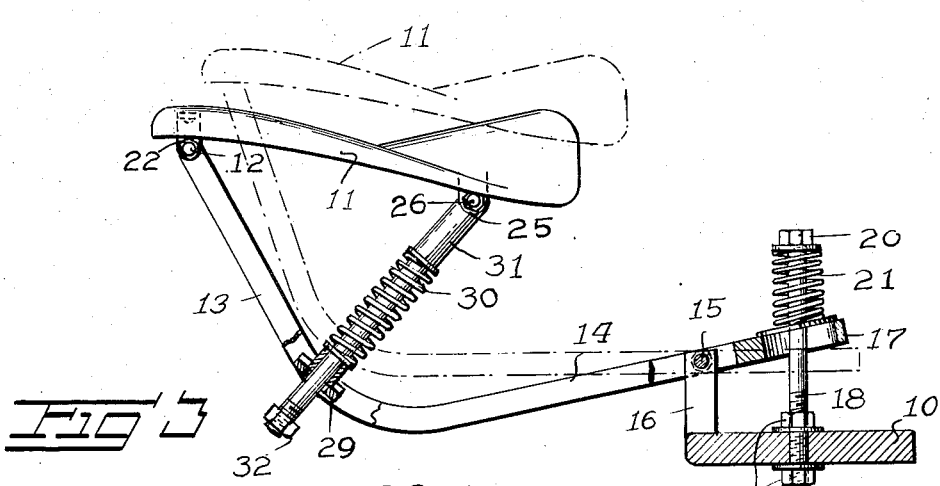
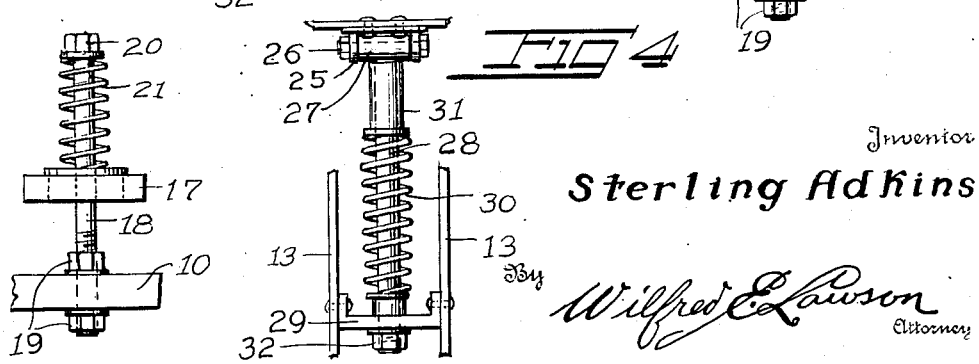
Inventor
Sterling Adkins
By Wilfred E. Lawson
Attorney Patented June 20, 1950

2,512,219

UNITED STATES PATENT OFFICE 2,512,219

SPRING SUPPORTED TRACTOR SEAT

Sterling Adkins, Newton, Ill.

Application December 11, 1946, Serial No. 715,420

4 Claims. (Cl. 155—51)

This invention relates to a seat for use on tractors, trucks, cultivators and other farm and similar vehicles and has for its object to provide a soft and comfortable ride for the operator.

For this purpose I provide two yielding elements to support the seat; one for general riding on a fairly smooth surface and another but stronger, yielding element which comes into action only when the vehicle passes over obstructions such as ruts or stones, and the seat will take a deeper set.

These and other objects and advantages will be evident from the subjoined description with the aid of the accompanying drawing.

In the drawing one embodiment of the invention is illustrated particularly applied to cultivators.

Figure 1 is a view in side elevation showing in full lines the seat on a cultivator, tractor or other farm vehicle in idle position and showing in broken outline the position it may assume with the employment of the present invention, under relatively smooth operating conditions;

Figure 2 is a view similar to Figure 1 with the relative position of parts when the vehicle wheels run along a rough surface over stones, ruts or other obstructions and the heavy spring or stronger yielding elements come into action;

Figure 3 is a view in front elevation of the lighter yielding element idle and;

Figure 4 a view in front elevation of the stronger yielding element idle;

Figure 5 a fractional sectional view of the hinge connection with the supporting arms.

Reference numeral 10 denotes a fixed part of a cultivator, tractor or other vehicle, namely a transverse beam adapted to support the yieldable mounted seat 11, which is supported at its rear edge on a hinge pin 12 upon the short shanks of a frame having a pair of parallel L-shaped arms 13, the long shanks 14 of which are hung for oscillation on a transverse bolt 15, carried by the upstanding lug 16 of the beam 10. A short distance forward of said hinge bolt 15, the shanks of the long arms 14 form a loop at 17 for free up and down swinging with respect to an upright spindle 18, which is adjustably secured by threaded nuts 19 on the beam 10. Between the spindle head 20 and the loop 17 of the shanks 14 is carried a compression spring 21 of medium strength for sustaining the seat 11 at normal height, with the driver seated thereon. By means of the nuts 19 the tilt of the arms 13 can be adjusted.

The hinge connection between the rear end of the seat 11 and the short shanks of the L-shaped arms 13, preferably consists of a bracket 22 riveted under the seat 11 and carrying the hinge bolt 12, see Figure 5.

Near the front edge of said seat another hinge bracket 25 is shown riveted under the seat and adapted to carry another hinge pin 26 which engages the cylindrical head 27 of a spring rod 28, the lower end of which is guided for axial movement in a transverse plate 29 riveted between the shanks 13 near the bend of the L-shaped arms. A strong compression spring 30 surrounds the rod 28 between said plate 29 and a sleeve 31 under the head 27, by means of which sleeve and a jam nut 32 threaded on the lower end of the rod 28, the strength of the spring 30 can be adjusted as desired.

It should be noted that the relative strength of the two springs 21 and 30 is so selected that during normal driving over a fairly smooth surface and normal load, only spring 21 is working to give gentle up and down motion of the seat, but that, when the vehicle wheels encounter rough roads with stones or furrows, the stronger spring 30 also comes into action for every bump, when the seat descends into substantially horizontal position as illustrated in Figure 2.

It is to be understood that the invention as herein disclosed may be varied from the details described and shown without departure from the spirit of the subjoined claims.

For comparison, the different positions that the seat will take under different conditions are indicated on the drawing, as follows:

Figure 1 shows, in full lines, the free position when not carrying a load. In broken lines of the same figure is shown the position assumed by the seat when occupied by the driver while riding thereon over a fairly smooth roadway. In this case only spring 21 becomes compressed and spring 30 remains expanded.

Figure 2 shows in broken lines the position which the seat may assume with the driver mounted thereon, when the vehicle is passing over a rough road surface. It will be noted that both springs 21 and 30 are compressed, but the seat is lowered parallelly to the free position, as indicated in broken lines, the same as in full lines in Figure 1.

It should be noted that the spring 21 is a stronger spring than 30. Spring 21 supports all total weight of both operator and seat with a lot of leverage from frame 13, 14. The spring 30 supports only about 60 percent of the rider's weight, the balance of weight resting on frame 13 at 22. The proportion of weight on spring 30 would vary at different heights of frame 13, 14.

I claim:

1. A vehicle seat structure comprising a supporting body having an upstanding part, a frame having a relatively long part and a shorter angularly extending part, said long part of the frame being disposed across and pivotally attached intermediate its ends to the upstanding part of the support whereby the shorter part of the frame extends upwardly and rearwardly away from the support, a spring connection between the support and the end of the long part of the frame between the pivot therefor and the free end thereof, a seat body pivotally attached adjacent to its back edge to the free end of the said shorter portion of the frame and extending forwardly over the longer portion thereof, and a compression spring interposed between the seat body adjacent to the forward edge of the latter and an underlying part of the frame.

2. A vehicle seat structure of the character described in claim 1 wherein said spring interposed between the seat and the frame extends rearwardly and downwardly from the forward under side of the seat.

3. A vehicle seat structure of the character described, comprising a supporting body, an upstanding member carried thereby, a frame comprising two connected spaced parallel parts and formed to provide a long bottom portion and an angularly directed upper portion, said bottom portion being positioned adjacent to its free end across the upstanding support, a horizontal pivot between said support and the bottom portion of the frame, the part of the bottom portion of the frame between the pivotal support and the free end of such portion being formed to provide a guide slot, a post carried by the supporting body and extending upwardly through said guide slot, a spring encircling the post and resting upon the top of said bottom portion of the frame and connected at its upper end with said post, a seat body, a pivotal connection between the seat body adjacent to the back edge thereof and the free end of the upwardly directed short portion of the frame whereby the seat body has vertical swinging movement on a horizontal pivot, and a compression spring interposed between the seat body adjacent to the forward edge thereof and the said frame adjacent to the part of the frame where the two portions thereof join.

4. A seat structure of the character described in claim 3 wherein the last mentioned spring is maintained in position by a rod member having a transverse pivot head at its upper end which is pivotally connected with the under side of the seat and a plate mounted across between the parts of the frame and having an aperture through which the rod is slidably extended, the said rod passing freely through the last mentioned spring.

STERLING ADKINS.

REFERENCES CITED

The following references are of record in the file of this patent:

UNITED STATES PATENTS

| Number | Name | Date |
| --- | --- | --- |
| 1,692,685 | Newman | Nov. 20, 1928 |
| 2,115,830 | Thiele | May 3, 1938 |
| 2,298,450 | Baker | Oct. 13, 1942 |